United States Patent
Xing (10) Patent No.: US 10,756,327 B2
(45) Date of Patent: Aug. 25, 2020

(54) SECONDARY BATTERY TOP COVER ASSEMBLY, SECONDARY BATTERY AND VEHICLE

(71) Applicant: CONTEMPORARY AMPEREX TECHNOLOGY CO., LIMITED, Ningde (CN)

(72) Inventor: Chengyou Xing, Ningde (CN)

(73) Assignee: CONTEMPORARY AMPEREX TECHNOLOGY CO., LIMITED, Ningde (CN)

(*) Notice: Subject to any disclaimer, the term of this patent is extended or adjusted under 35 U.S.C. 154(b) by 82 days.

(21) Appl. No.: 16/101,290

(22) Filed: Aug. 10, 2018

(65) Prior Publication Data

US 2019/0221827 A1     Jul. 18, 2019

(30) Foreign Application Priority Data

Jan. 18, 2018   (CN) .......................... 2018 1 0051374

(51) Int. Cl.
*H01M 2/34*     (2006.01)
*H01M 2/12*     (2006.01)
*H01M 2/04*     (2006.01)

(52) U.S. Cl.
CPC ............. *H01M 2/345* (2013.01); *H01M 2/04* (2013.01); *H01M 2/043* (2013.01); *H01M 2/12* (2013.01); *H01M 2/1235* (2013.01); *H01M 2/1294* (2013.01); *H01M 2200/20* (2013.01); *H01M 2220/20* (2013.01)

(58) Field of Classification Search
CPC .................................................... H01M 2/345
See application file for complete search history.

(56) References Cited

U.S. PATENT DOCUMENTS 8,642,196 B2 * 2/2014 Guen ................... H01M 2/0473
429/53
2015/0287977 A1   10/2015 Lee et al.

FOREIGN PATENT DOCUMENTS

WO        2017222260 A1     12/2017
WO        WO-2017222260     * 12/2017         H01M 2/04
WO        WO-2017222260 A1 * 12/2017         H01M 2/04

OTHER PUBLICATIONS

Extended European Search Report, dated Dec. 11, 2018, issued in corresponding European Patent Application No. 180006223, 34 pages.

* cited by examiner

*Primary Examiner* — Ula C Ruddock
*Assistant Examiner* — Thomas H. Parsons
(74) *Attorney, Agent, or Firm* — Christensen O'Connor Johnson Kindness PLLC (57) ABSTRACT

The present disclosure provides a secondary battery top cover assembly, a secondary battery and a vehicle. The top cover assembly includes: a top cover plate; an electrode terminal; and a short-circuit component including a deformable plate and a conductive plate disposed above the deformable plate. The deformable plate is connected to the top cover plate, and the conductive plate is connected to the electrode terminal. The conductive plate includes a body portion and a protrusion portion protruding upwardly from the body portion, the conductive plate is provided with a gas hole, and the gas hole cuts through the protrusion portion and the body portion, an inner wall of the gas hole includes an arc-shaped smooth transition portion.

9 Claims, 5 Drawing Sheets

SECONDARY BATTERY TOP COVER ASSEMBLY, SECONDARY BATTERY AND VEHICLE

CROSS-REFERENCE TO RELATED APPLICATIONS

The present application claims priority to Chinese Patent Application No. 201810051374.4, filed on Jan. 18, 2018, the content of which is incorporated herein by reference in its entirety.

TECHNICAL FIELD

The present disclosure relates to the technical field of energy storage devices, and in particular, to a secondary battery top cover assembly, a secondary battery, and a vehicle.

BACKGROUND

Secondary batteries (for example, lithium ion batteries) have advantages such as high energy density, high power density, reusability, long storage time, and the like, and are widely used in portable electronic devices such as mobile phones and laptops, and large and medium-sized electric devices such as electric bicycles and electric vehicles. In addition, secondary batteries have become a key to solving global problems such as energy crisis and environmental pollution. However, with the wide application of the secondary batteries, people have raised higher demands on safety performance of the secondary batteries.

SUMMARY

The present disclosure provides a secondary battery top cover assembly, a secondary battery, and a vehicle, aiming to improve the safety of the secondary battery.

The present disclosure provides a secondary battery top cover assembly, including: a top cover plate; an electrode terminal; and a short-circuit component. The short-circuit component includes a deformable plate and a conductive plate disposed above the deformable plate. The deformable plate is connected to the top cover plate. The conductive plate is connected to the electrode terminal. The conductive plate includes a body portion and a protrusion portion protruding upwardly from the body portion. The conductive plate is provided with a gas hole, and the gas hole cuts through the protrusion portion and the body portion. An inner wall of the gas hole includes an arc-shaped smooth transition portion.

Optionally, the arc-shaped smooth transition portion has an aperture size decreasing upwards.

Optionally, the inner wall of the gas hole includes a first guide portion connected to the arc-shaped smooth transition portion. The first guide portion extends from the arc-shaped smooth transition portion toward the body portion and is connected to the body portion. The first guide portion has an aperture size increasing downwards.

Optionally, the inner wall of the gas hole further includes a second guide portion connected to the arc-shaped smooth transition portion. The second guide portion extends upwardly from the arc-shaped smooth transition portion in a direction away from the body portion.

Optionally, the gas hole is aligned with a center of the deformable plate. The conductive plate further includes an annular contact portion protruding downwardly. The annular contact portion contacts with the deformable plate when the deformable plate is deformed upwardly. A thickness of a region of the conductive plate located inside the annual contact portion is smaller than a thickness of a region of the conductive plate located outside the annual contact portion.

Optionally, the gas hole is deviated from a center of the deformable plate.

Optionally, a cavity for deforming of the deformable plate is formed between the deformable plate and the conductive plate, and the gas hole overlaps an edge of the cavity.

Optionally, the top cover plate is provided with a through hole. The deformable plate seals the through hole. The secondary battery top cover assembly further includes an annular sealing piece. The annular sealing piece is disposed between the conductive plate and the top cover plate and seals the through hole and the gas hole.

The present disclosure further provides a secondary battery, including: an electrode assembly; a case for accommodating the electrode assembly; and any one of the abovementioned secondary battery top cover assembly. The secondary battery top cover assembly seals an opening of the case, and the electrode terminal is connected to the electrode assembly.

The present disclosure further provides a vehicle including the abovementioned secondary battery.

The technical solution provided by the present disclosure can achieve the following beneficial effects.

The present disclosure provides a secondary battery top cover assembly. The gas hole in the conductive plate is surrounded by the protrusion portion arranged to protrude upwardly. The inner wall of the gas hole includes an arc-shaped smooth transition portion, and the arc-shaped smooth transition portion can reduce the flow resistance with respect to the gas. When gas leaks from the gas hole, the arc-shaped smooth transition portion can facilitate smoothness of gas leaking out, thereby accelerating flow rate of the gas in the gas hole and thus preventing gas from staying in the gas hole. This can improve sensitivity of the deformable plate and improve safety of the secondary battery. At the same time, the gas hole in the conductive plate is surrounded by the protrusion portion arranged to protrude upwardly, such that liquid can be prevented from flowing into the space above the deformable plate, which would otherwise make the deformable plate conductive with the conductive plate. Thus, this can avoid the external short-circuit occurring in the positive electrode plate and the negative electrode plate due to liquid inflow in the secondary battery.

It should be understood that the foregoing general description and the following detailed description are exemplary only, and do not limit the present disclosure.

REFERENCE SIGNS

- 1000—secondary battery;
- 100—case;
- 200—top cover assembly;
- 202—top cover plate;
  - 202a—through hole;
  - 202b—explosion-proof opening;
- 204—first electrode terminal;
  - 2042—flange portion;
- 2044—column portion;
- 206—second electrode terminal;
- 208—first terminal plate;
- 210—second terminal plate;
- 212—deformable plate;
- 2122—central portion;
- 2124—edge portion;
- 214—conductive plate;
- 2142—body portion;
- 2144—protrusion portion;
- 2146—annular contact portion;
- 2148—circular region;
- 214a—gas hole;
  - 214aa—arc-shaped smooth transition portion;
  - 214ab—first guide portion;
  - 214ac—second guide portion;
- 218—upper insulating piece;
- 220—lower insulating piece;
- 222—sealing ring;
- 224—insulating cover;
- 2242—covering portion;
- 2242a—top wall;
- 2242b—side wall;
- 2244—body;
  - 2244a—vent hole;
- 2246—obstructing portion;
  - 2246a—mouth;
- 2248—protrusion;
  - 2248a—surrounding portion;
  - 2248b—convoluted portion;
  - 2248c—separating portion;
- 2250—mounting protrusion;
- 226—vent;
- 228—insulating piece;
- 228a—base portion;
- 228b—column-like protrusion portion;
- 300—electrode assembly;
- 302—first electrode tab;
- 304—second electrode tab;
- 400—insulating film;
- 500—first current collector;
- 502—first electrode plate connecting portion;
- 600—second current collector;
- 602—second electrode plate connecting portion;
- 800—annular sealing piece.

The accompanying drawings, which are incorporated in and constitute a part of this specification, illustrate embodiments consistent with the disclosure, and together with the specification serve to explain the principles of the present disclosure.

DESCRIPTION OF EMBODIMENTS

The present disclosure will be further described in detail as follows by embodiments and with reference to the accompanying drawings.

It should be noted that, the expressions such as "upper", "lower", "left", "right" and the like mentioned in embodiments of the present disclosure are described with reference to the placement status in the accompanying drawings, and should not be construed as limiting embodiments of the present disclosure. In addition, it should also be understood that, in the context, while referring to an element being formed "above" or "below" another element, it is possible that the element is directly formed "above" or "below" the other element, it is also possible that the element is formed "above" or "below" the other element via a middle element.

Figure 1:
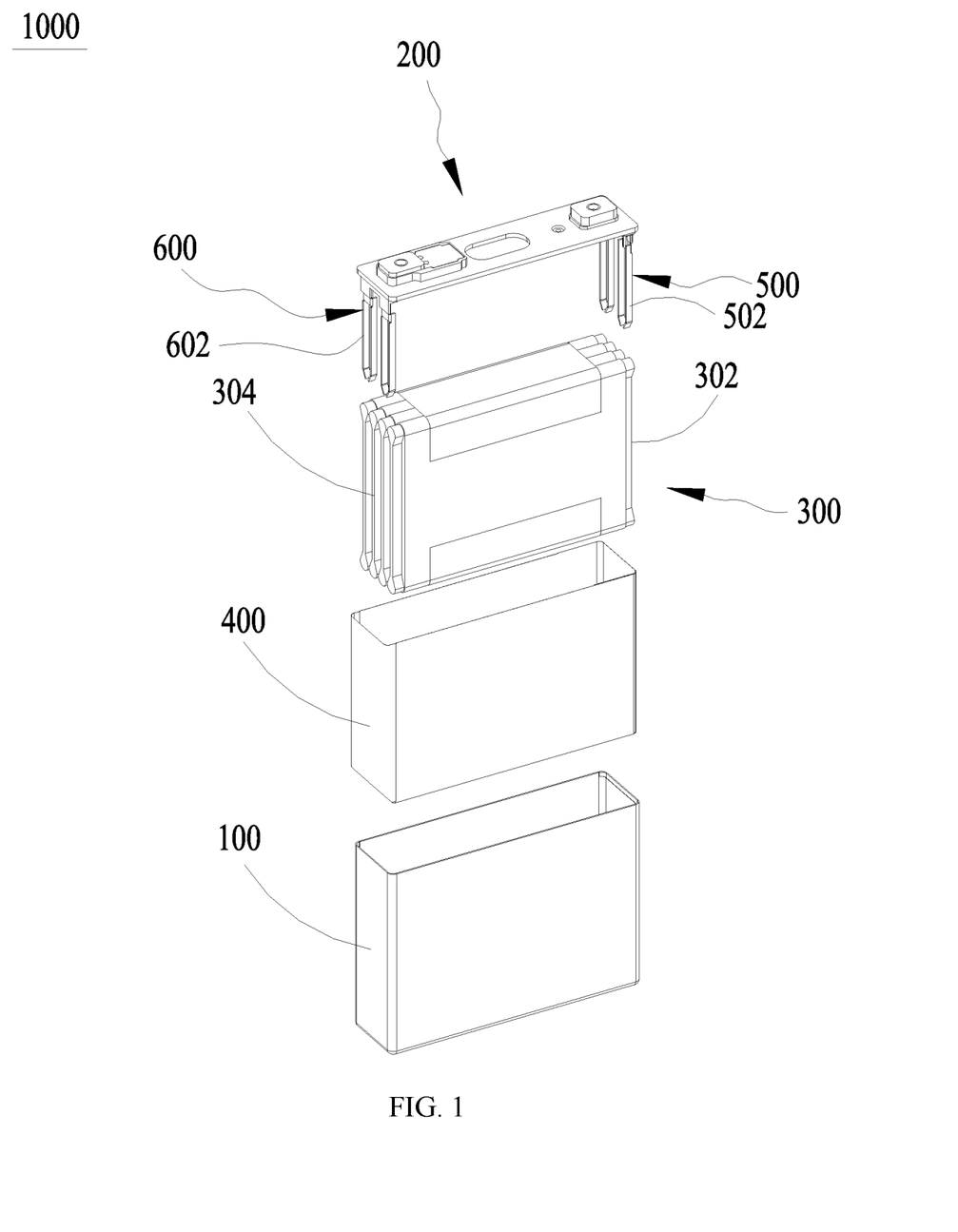
FIG. 1 is an exploded view of a secondary battery according to an embodiment of the present disclosure.

As shown in FIG. 1, FIG. 1 is an exploded view of a secondary battery.

The secondary battery 1000 includes a case 100, a secondary battery top cover assembly 200 (hereinafter referred to as a top cover assembly), an electrode assembly 300, and an insulating film 400. The electrode assembly 300 and electrolyte can be accommodated in the case 100 through an opening of the case 100, the electrode assembly 300 is wrapped by the insulating film 400, the opening of the case 100 can be sealed by the top cover assembly 200, and contact portions of the top cover assembly 200 and the case 100 may be connected to each other, for example, by means of welding.

The electrode assembly 300 is made by means of winding or laminating, and includes a first electrode plate, a second electrode plate, and a separator for separating the first electrode plate from the second electrode plate. Here, the first electrode plate may be used as a negative electrode plate, and the second electrode plate may be used as a positive electrode plate, and vice versa.

The first electrode plate and the second electrode plate each include a coated-portion coated with active material and an uncoated-portion not coated with active material. The active material coated on the first electrode plate is different from the active material coated on the second electrode plate, thus the first electrode plate and the second electrode plate can have different polarities.

In an example, the first electrode plate is a positive electrode plate, and the active material coated on the positive electrode plate may be lithium iron phosphate, lithium cobaltate, lithium manganate, and the like. The second electrode plate is a negative electrode plate, and the active material coated on the negative electrode plate may be carbon or silicon. Then, the uncoated-portion of the first electrode plate is as a first electrode tab 302, and the uncoated-portion of the second electrode plate can be formed as a second electrode tab 304.

The secondary battery further includes a first current collector 500 and a second current collector 600, and the first electrode plate and the second electrode plate of the electrode assembly 300 may be connected to the first current collector 500 and the second current collector 600, respectively. The first current collector 500 is made of conductive material and is connected to the first electrode tab 302 located at one end of the electrode assembly 300 so as to get connected to the first electrode plate.

The first current collector 500 includes a first terminal connecting portion (not shown in drawings) and a first electrode plate connecting portion 502. The first electrode plate connecting portion 502 is connected to the first electrode tab 302, and the first terminal connecting portion is connected to a first electrode terminal 204 of the top cover assembly 200. The first terminal connecting portion is provided with a connecting hole, which is matched with the first electrode terminal 204, such that the first electrode terminal 204 is accommodated in the connecting hole. The first electrode terminal 204 and the first terminal connecting portion may be connected to each other, for example, by means of welding.

The second current collector 600 is made of conductive material and is connected to the second electrode tab 304 located at one end of the electrode assembly 300 so as to get connected to the second electrode plate.

The second current collector 600 includes a second terminal connection portion (not shown in the drawings) and a second electrode plate connecting portion 602. The second electrode plate connecting portion 602 is connected to the second electrode tab 304, and the second terminal connecting portion is connected to a second electrode terminal 206 of the top cover assembly 200. The second terminal connecting portion is provided with a connection hole, which is matched with the second electrode terminal 206, such that the second electrode terminal 206 is accommodated in the connecting hole. The second electrode terminal 206 and the second terminal connecting portion may be connected to each other, for example, by means of welding.

Figure 2:
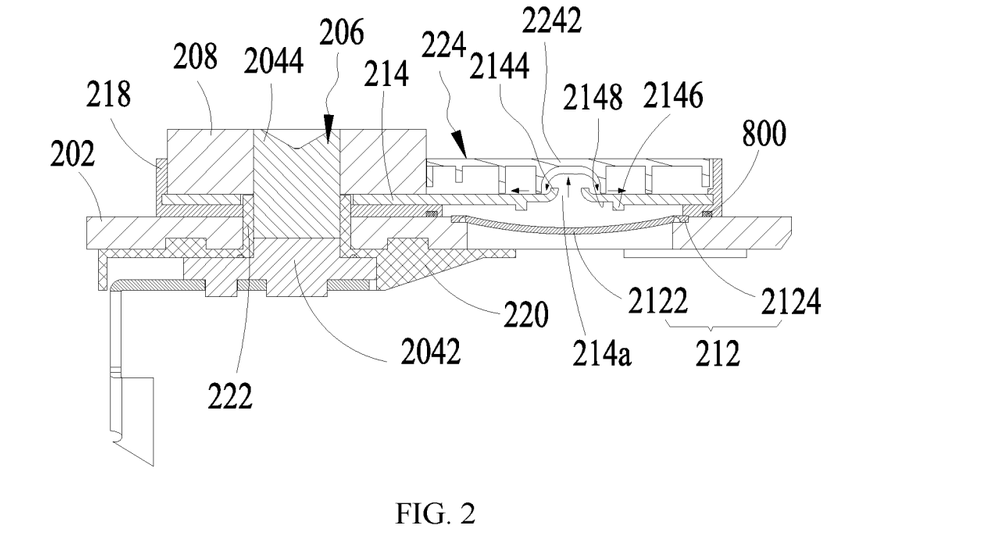
FIG. 2 is a cross-section view of a partial structure of a secondary battery top cover assembly according to an embodiment of the present disclosure.
Figure 3:
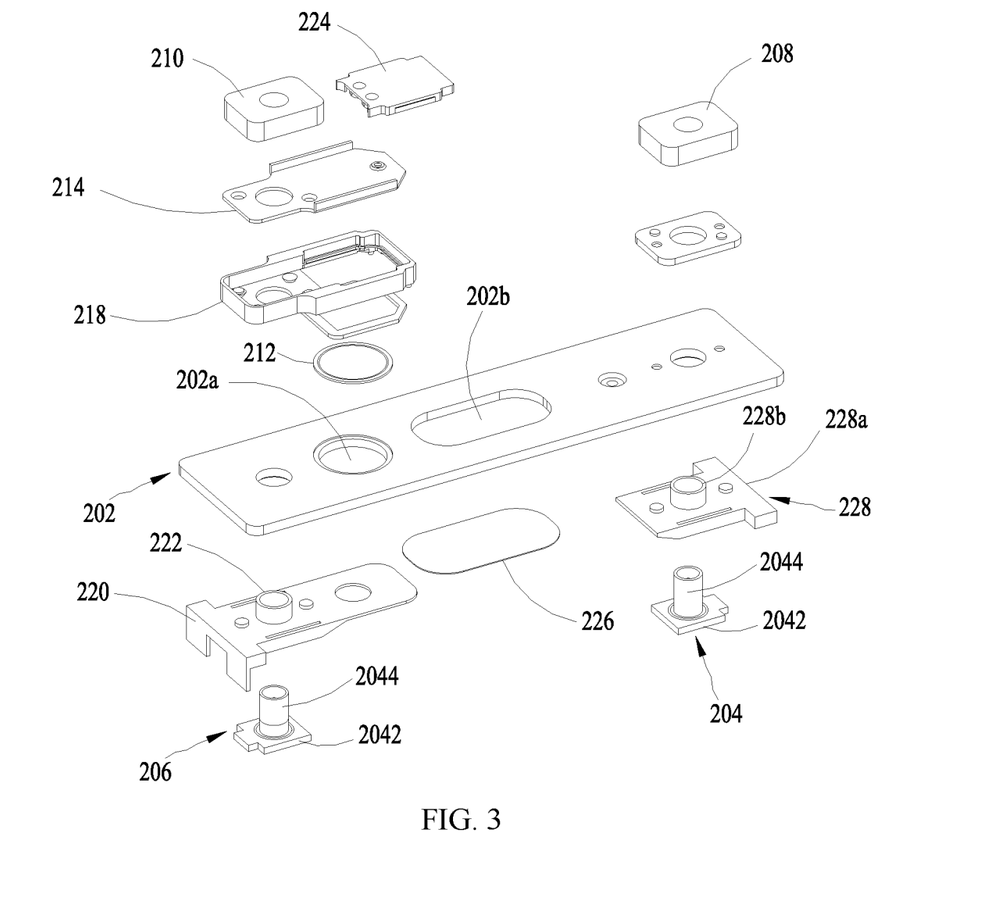
FIG. 3 is an exploded view of a secondary battery top cover assembly according to an embodiment of the present disclosure.

With reference to FIGS. 2-3, FIG. 2 shows a cross-section view of a partial structure of a secondary battery top cover assembly, and FIG. 3 shows an exploded view of a top cover assembly.

The top cover assembly 200 includes a top cover plate 202, a first electrode terminal 204, and a second electrode terminal 206. The first electrode terminal 204 and the second electrode terminal 206 each include a flange portion 2042 and a column portion 2044. The flange portion 2042 is located in the case 100 and is connected to the first terminal connecting portion, and the column portion 2044 extends out of the top cover plate 202.

Further, the top cover assembly 200 may include a first terminal plate 208 and a second terminal plate 210. The first terminal plate 208 is connected to the column portion 2044 of the first electrode terminal 204, for example, by means of riveting. The second terminal plate 210 is connected to the column portion 2044 of the second electrode terminal 206, for example, by means of welding.

The top cover assembly 200 may further include a short-circuit component. The short-circuit component includes a deformable plate 212 and a conductive plate 214 disposed above the deformable plate 212. The top cover plate 202 is provided therein with a through hole 202a. The deformable plate 212 seals the through hole so as to get connected to the top cover plate 202. The conductive plate 214 may be connected to the first electrode terminal 204, and correspondingly, the through hole 202a is arranged at a side of the top cover plate 202 close to the first electrode terminal 204. Further, the top cover plate 202 is insulated from the first electrode terminal 204. The top cover plate 202 is connected to the second electrode terminal 206.

The internal gas pressure of the secondary battery increases when the secondary battery is overcharged. When the gas pressure increases to a certain value, the deformable plate 212 can be pushed to deform upwards and then is connected to the conductive plate 214, such that the first electrode terminal 204 is electrically connected to the second electrode terminal 206. That is, the first electrode plate and second electrode form an external short-circuit, and then electrical energy can be released so as to eliminate hazard caused by overcharging.

In an example, the top cover plate 202 can be set in such a manner that it is insulated from the first electrode terminal 204 and is insulated from the second electrode terminal 206. In this case, it is only needed to provide a short-circuit component at a side of the first electrode terminal 204 and provide a short-circuit component at a side of the second electrode terminal 206, i.e., two deformable plates 212 and two conductive plates 214.

In another embodiment, the conductive plate 214 can be connected to the second electrode terminal 206, and correspondingly, the through hole 202a is arranged at a side of the top cover plate 202 close to the second electrode terminal 206. In this case, the top cover plate 202 can be electrically connected to the first electrode terminal 204.

It should be noted that a positive electrode terminal in the secondary battery 1000 is usually made of aluminum material, and a negative electrode terminal is usually made of copper material. Oxidation potential of aluminum material is higher than oxidation potential of copper material, in order to relieve corrosion of the top cover plate 202 and the case 100 caused by electrolyte, both the top cover plate 202 and the case 100 can be made of aluminum material. That is, when the first electrode terminal 204 is the positive electrode terminal and the second electrode terminal 206 is the negative electrode terminal, it will be better that the first electrode 204 is electrically connected to the top cover plate 202 and the second electrode 206 is insulated from the top cover plate 202. The short-circuit component is disposed at a side close to the second electrode terminal 206, and the top cover plate 202 is connected to the second electrode terminal 206 through the short-circuit component.

The present disclosure will be described by taking an example that the first electrode terminal 204 is a positive electrode terminal and the second electrode terminal 206 is a negative electrode terminal.

The top cover assembly 200 further includes a plurality of insulating pieces, including an upper insulation piece 218 and a lower insulation piece 220. The upper insulation piece 218 is disposed between the conductive plate 214 and the top cover plate 202, and the lower insulation piece 220 is disposed between the flange portion 2042 of the second electrode terminal 206 and the top cover plate 202, so as to prevent or decrease unexpected short-circuit.

In addition, the top cover assembly 200 further includes a sealing ring 222, which is disposed in the connecting hole and between the column portion 2044 and the top cover plate 202 so as to prevent electrolyte leakage. The sealing ring 222 can be integrally formed with the lower insulation piece 220.

When the internal pressure in the secondary battery 1000 exceeds a preset pressure due to overcharging of the secondary battery 1000, a central portion 2122 of the deformable plate 212 is deformed and protrudes upward under the internal pressure to contact the conductive plate 214, resulting in short-circuit of the secondary battery 1000.

It should be understood that, when the deformable plate 212 is deformed toward the conductive plate 214, gas above the deformable plate 212 can escape from the secondary battery 1000, such that pressure against the deformable plate 212 from the gas above the deformable plate 212 can be decreased. This can allow the deformable plate 212 to operate normally.

Figure 4:
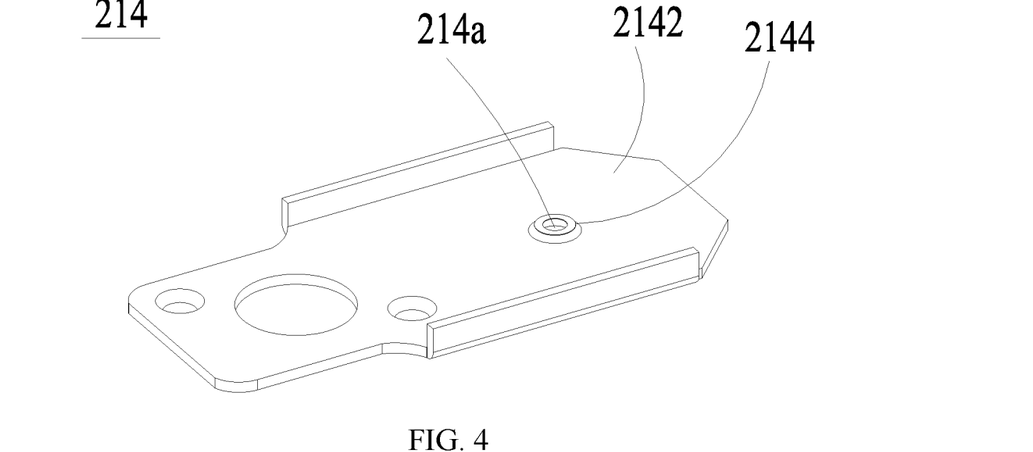
FIG. 4 is a schematic diagram of a conductive plate according to an embodiment of the present disclosure.

According to an exemplary embodiment, referring to FIG. 4, which shows a schematic diagram of a conductive plate, the conductive plate 214 is formed as a plate-like structure, which includes a body portion 2142 and a protrusion portion 2144 protruding upwardly from the body portion. The body portion 2142 of the conductive plate 214 is a flat plate-like base body. The protrusion portion 2144 extends upwardly from an upper surface of the body portion 2142. A gas hole 214a for expelling gas above the deformable plate 212 is arranged in the conductive plate 214, and the gas hole 214a is surrounded by the protrusion portion 2144. The gas hole 214a in the conductive plate 214 is surrounded by the protrusion portion 2144, such that liquid can be prevented from flowing above the deformable plate 212 to make the deformable plate 212 to be conductive with the conductive plate 214. Therefore, this can prevent liquid from flowing in the secondary battery during normal use, which would otherwise lead to an electrical connection between the positive electrode plate and the negative electrode plate and thereby result in the external short circuit.

When the internal pressure of the secondary battery 1000 exceeds a preset threshold pressure, the internal pressure causes the deformable plate 212 to deform, and the gas above the deformable plate 212 escapes from the gas hole 214a to reduce the resistance against the deformable plate 212 when deforming.

It should be noted that in the secondary battery 1000, a high design precision is required for the deformable plate 212, i.e., the deformable plate 212 should have a high sensitivity. That is, the deformable plate 212 needs to be able to quickly deform under a predetermined gas pressure, so as to satisfy the safety requirement on the secondary battery 1000. Therefore, it is necessary to satisfy the following conditions. On the one hand, the manufacturing and processing errors of the deformable plate 212 itself should be minimized. On the other hand, external factors affecting deforming of the deformable plate 212 should be minimized. Here, the gas hole 214a is an external factor that may affect deforming of the deformable plate 212 and thus its design is very importance.

Figure 5:
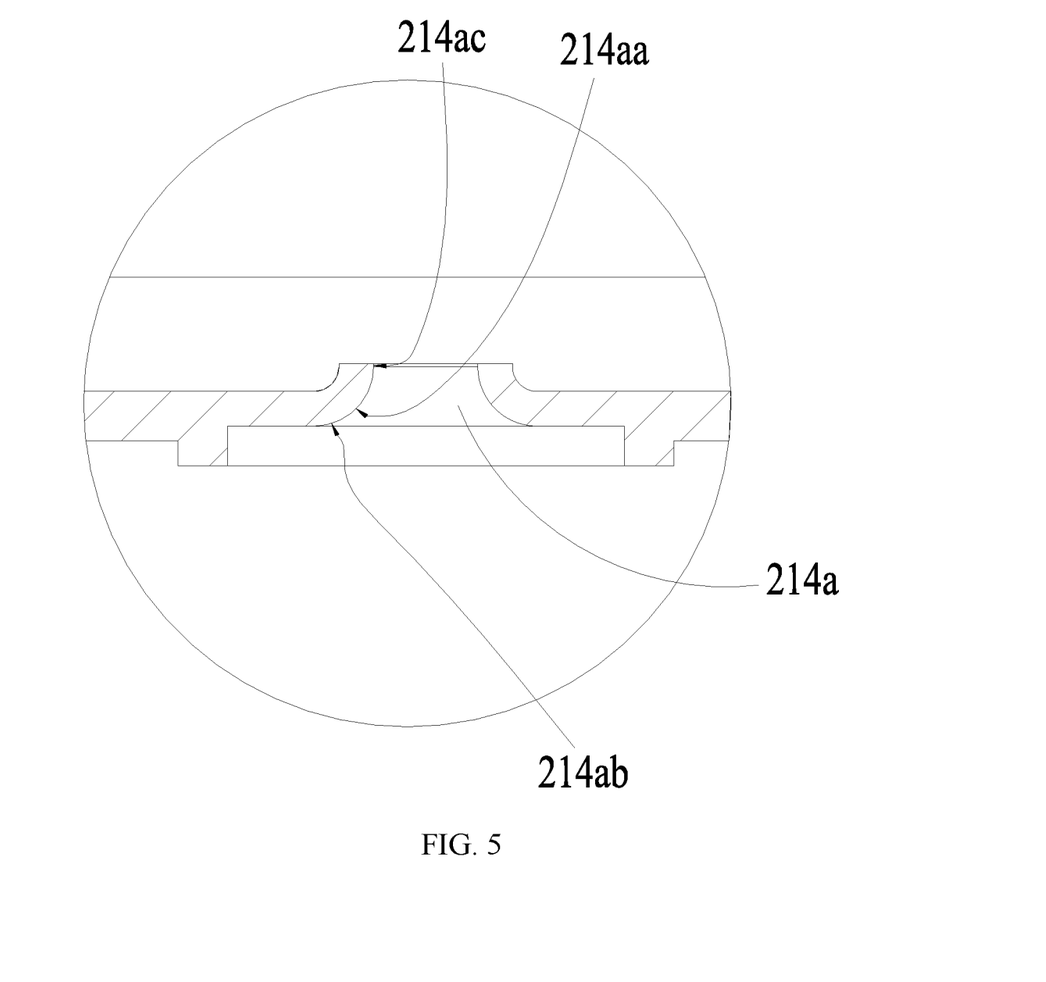
FIG. 5 is an enlarged view of a partial cross-section view of a conductive plate according to an embodiment of the present disclosure.

With reference to FIG. 5, FIG. 5 shows a cross-section view of a partial structure of a conductive plate.

In the present disclosure, the inner wall of the gas hole 214a includes an arc-shaped smooth transition portion 214aa, which can reduce the flow resistance with respect to the gas. When gas leaks from the gas hole 214a, the arc-shaped smooth transition portion 214aa can facilitate smoothness of gas leaking out, thereby accelerating flow rate of the gas in the gas hole 214a, and thus preventing gas from staying in the gas hole 214a, thereby improving sensitivity of the deformable plate 212 and improving safety of the secondary battery.

In an embodiment, the arc-shaped smooth transition portion 214aa can be in a form of a tapered crater structure, that is, the cross-sectional area of the arc-shaped smooth transition portion 214aa gradually decreases along the flow direction of the gas. With this arrangement, the tapered structure has a function of gathering gas, such that dispersed gas with different flow directions flowing into the gas hole 214a can be gathered and concentrated into gas flow having a relatively uniform flow direction, thereby accelerating the flow speed of the gas.

It should be noted that the requirement for the amount of the gas flow can still be satisfied at the small cross-sectional area of the arc-shaped smooth transition portion 214aa without impeding the gas flow through this region.

In an example, with further reference to FIG. 5, the inner wall of the gas hole 214a can further include a first guide portion 214ab connected to the arc-shaped smooth transition portion 214aa. The first guide portion 214ab may guide the flow direction of the gas such that the gas can enter the gas hole 214a along a desired path. Specifically, the first guide portion 214ab extends from the arc-shaped smooth transition portion 214aa toward the body portion 2142, and is connected to the body portion 2142. The first guide portion 214ab has an aperture size increasing downwards.

It should be understood that the first guide portion 214ab forms a horn-like opening at the entrance of the gas hole 214a. After the deformable plate 212 is deformed, the gas above the deformable plate 212 can rapidly and concentratedly get into the gas hole 214a via the horn opening, such that the gas can be decreased or can be even prevented from staying above the deformable plate 212.

In addition, optionally, the inner wall of the gas hole 214a further includes a second guide portion 214ac connected to the arc-shaped smooth transition portion 214aa, and the second guide portion 214ac can guide the gas to rapidly expel from the inside of the secondary battery 1000 to the outside, and the second guide portion 214ac extends upwardly from the arc-shaped smooth transition portion 214aa in a direction away from the body portion 2142. That is, an axis of the second guide portion 214ac extends along a vertical direction instead of a direction of a curve, thereby shortening the circulation path and the circulation time of the gas in the gas hole 214a and thus accelerating escape of the gas from the gas hole 214a.

With further reference to FIG. 2, according to an exemplary embodiment, the gas hole 214a overlaps the deformable plate 212. It should be understood that a projection of the center of the deformable plate 212 in the height direction falls within the range of the gas hole 214a.

As described above, the conductive plate 214 and the deformable plate 212 form a short-circuit component of the secondary battery 1000. Therefore, the deformable plate 212 should be brought into contact with the conductive plate 214 after being deformed, and a cavity for deforming of the deformable plate 212 is formed between the deformable plate 212 and the conductive plate 214. The cavity is deforming space for the deformable plate 212.

The deformable plate 212 contacts with the conductive plate 214 at the central portion 2122, however, since the gas hole 214a in the conductive plate 214 is overlaps the center portion 2122 of the deformable plate 212, the contact area between the deformable plate 212 and the conductive plate 214 would be decreased, and the contact resistance would be increased. In this case, the conductive plate 214 may be provided to include an annular contact portion 2146 protruding downwardly. When the deformable plate 212 is deformed upwardly, the central portion 2122 of the deformable plate 212 no longer contacts with the conductive plate 214, and an annular region of the deformable plate 212 surrounding the central portion 2122 contacts with the annular contact portion 2146 protruding downwardly, so as to avoid poor contact between the conductive plate 214 and the deformable plate 212.

It should be noted that after the deformable plate 212 is deformed upwardly, the central portion 2122 of the deformable plate 212 moves from a lowest position to a highest position with respect to the edge portion 2124 (the portion connected to the top cover plate 202), and the central portion 2122 is disposed in the inner region surrounded by the annular contact portion 2146.

In order to allow the deformable plate 212 to have sufficient deforming space, according to an embodiment, a thickness of a circular region 2148 of the conductive plate 214 located inside the annual contact portion 2146 is smaller than a thickness of a region of the conductive plate 214 located outside the annual contact portion 2146. In this way, the circular region 2148 located inside the annual contact portion 2146 can provide the central portion 2122 with deforming space, and when the deformable plate 212 is deformed, the central portion 2122 thereof is just received in the circular region 2148 surrounded by the annular contact portion 2146. With this solution, space inside the secondary battery 1000 occupied by the top cover assembly 200 can be saved, and energy density of the secondary battery 1000 can be increased compared to the solution of increasing the deforming space by downwardly moving the deformable plate 212.

Figure 6:
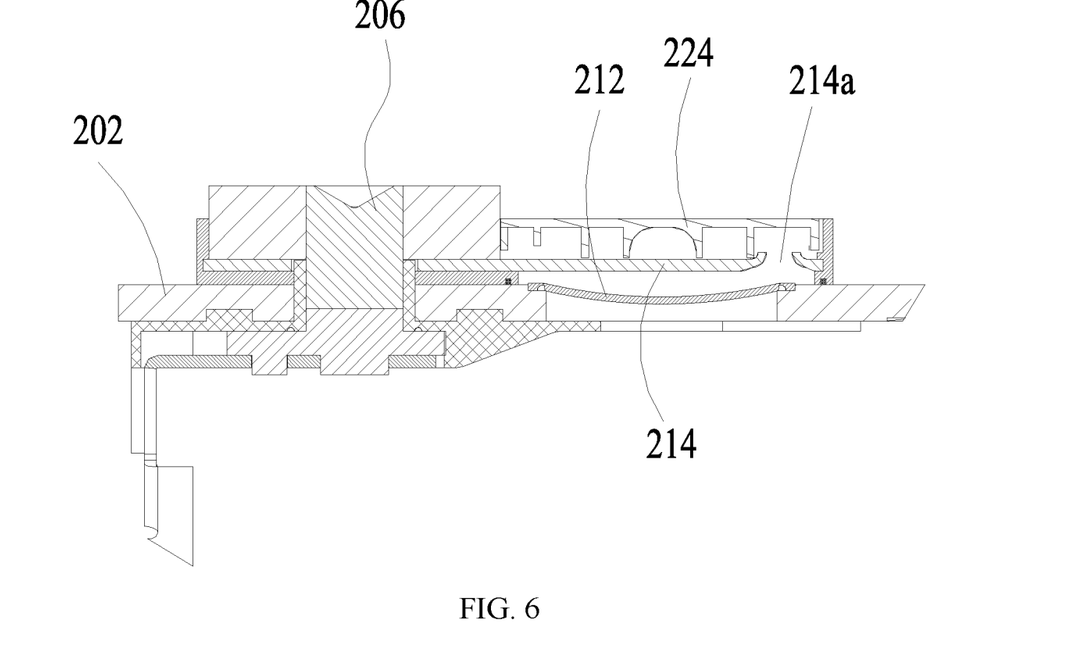
FIG. 6 is a cross-section view of a partial structure of a secondary battery top cover assembly according to an embodiment of the present disclosure.

With reference to FIG. 6, in another embodiment, the gas hole 214a may also be offset with respect to the deformable plate 212. That is, the projection of the center of the deformed sheet 212 in the height direction is out of the range of the air hole 214a.

In the embodiment shown in FIG. 6, the gas hole 214a is disposed at an edge of the conductive plate 214 and close to the first electrode terminal 204, and the gas hole 214a overlaps the edge of the deforming space.

When the deformable plate 212 is deformed, the gas in the deforming space flows toward the gas hole 214a under the effect of the deformable plate 212. Since the gas hole 214a is disposed at the edge of the deforming space, gas flow directions in the right space are basically consistent after the deformable plate 212 contacts with the conductive plate 214, that is, the gas flowing toward the gas hole 214a basically keeps in a same direction instead of meandering within the deforming space, thereby improving the smoothness and rapidity of the gas flowing into the gas hole 214a. Further, with reference to FIGS. 2-3, in order to prevent the liquid from flowing along the upper surface of the top cover plate 202 into the deformable plate 212 so that the deformable plate 212 is electrically connected to the conductive plate, the secondary battery top cover assembly further includes an annular sealing piece 800 disposed between the upper insulating piece 218 and the top cover plate 202. The annular sealing piece 800 seals the through hole 202a and the gas hole 214a.

With further reference to FIG. 2, in order to prevent the gas hole 214a from being exposed, the secondary battery top cover assembly further includes an insulating cover 224. The insulating cover 224 is disposed above the conductive plate 214 and wraps the exposed portion of the conductive plate 214. The insulating cover 224 includes a covering portion 2242 disposed above the conductive plate 214. The covering portion 2242 covers the protrusion portion 2144 and thus covers the gas hole 214a. In order to allow the gas to expel from the gas hole 214a, a gas flow channel is arranged between the protrusion portion 2144 and the covering portion 2242, and the gas flow channel communicates with the ambiance, such that the gas can be expelled from the secondary battery via the gas hole 214a and the gas flow channel.

According to the above description, since the protrusion portion 2144 protrudes upwardly from the body portion 2142, the moisture or electrolyte condensed on the body portion 2142 needs to climb to the top of the protrusion portion 2144 to enter the gas hole 214a, which increases difficulty for the moisture or electrolyte to enter the gas hole 214a. Moreover, since the covering portion 2242 covers the protrusion portion 2144 such that the gas hole 214a is directly covered by the covering portion 2242, the moisture or electrolyte needs a long path to enter the gas hole 214a, such that the probability of the moisture or electrolyte entering the gas hole 214a can be decreased.

According to an exemplary embodiment, in order to reduce the amount of moisture or electrolyte condensed on the inner wall of the covering portion 2242 that enter the gas hole 214a, an arrangement can be applied in which the bottom surface of the covering portion 2242 is lower than the top surface of the protrusion portion 2144. That is, the covering portion 2242 can also play a role of flow guiding. By having the covering portion 2242 surrounding at the periphery of the protrusion portion 2144, moisture or electrolyte condensed on the inner wall of the covering portion 2242 can fall onto the body portion 2142 along the inner wall and is further obstructed by the protrusion portion 2144 protruding upwardly.

Meanwhile, such arrangement can also reduce the distance between the covering portion 2242 and the body portion 2142, thereby preventing splashing of water droplets or electrolyte droplets.

After the gas expels from the gas hole 214a, it is obstructed by the covering portion 2242 and then its direction would be changed. The flow direction of the gas in the gas flow channel is the direction shown by the arrow in FIG. 2.

Figure 7:
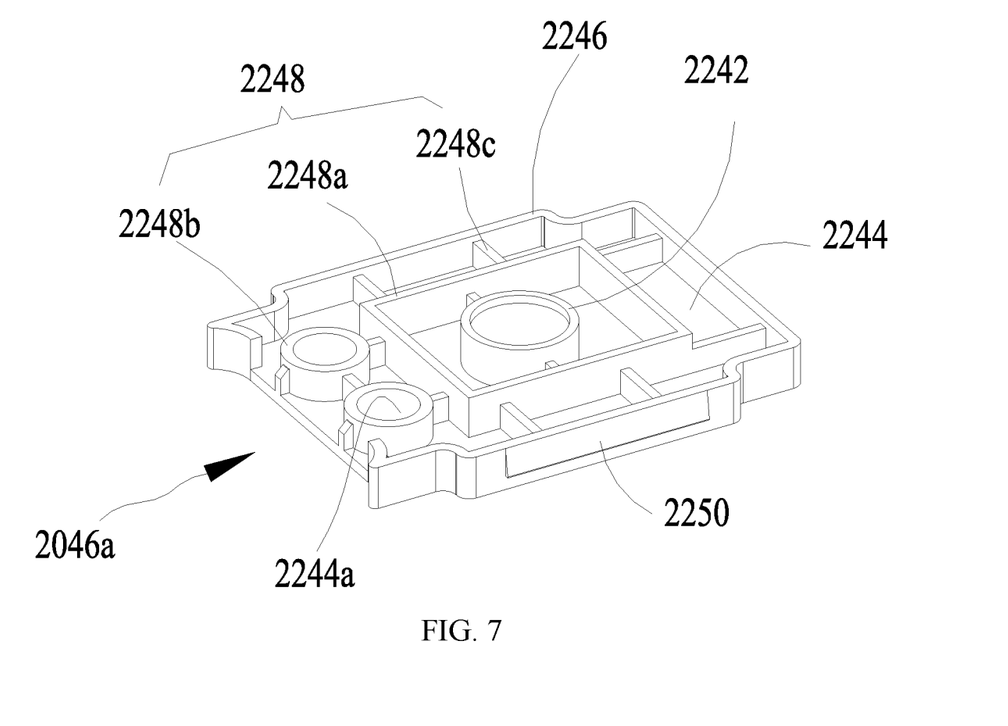
FIG. 7 is a perspective view of an insulating cover according to an embodiment of the present disclosure.
Figure 8:
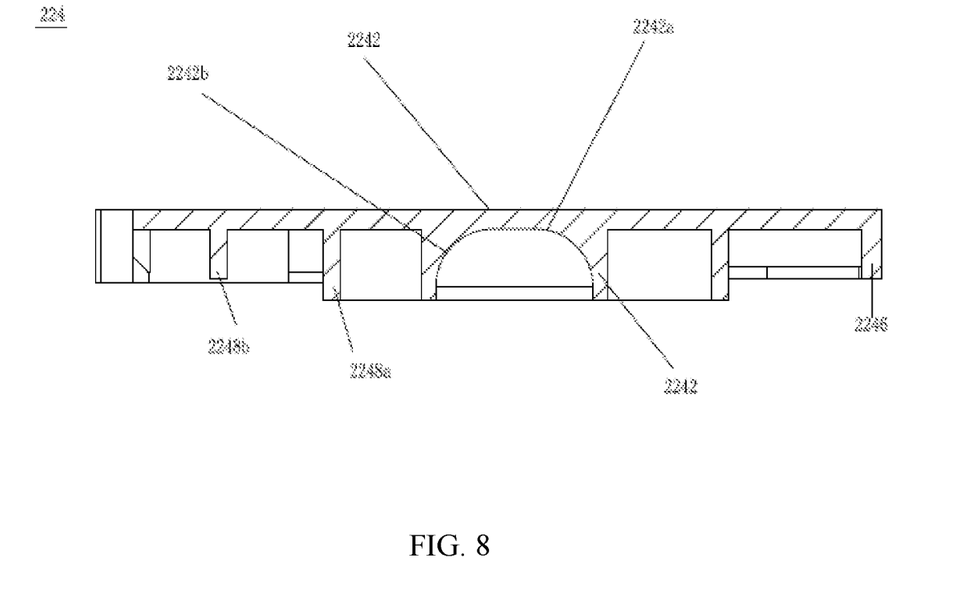
FIG. 8 is a cross-section view of an insulating cover according to an embodiment of the present disclosure.

With reference to FIGS. 7-8, FIG. 7 shows a perspective view of an insulating cover, and FIG. 8 shows a cross-section view of an insulating cover.

The inner wall of the covering portion 2242 includes a top wall 2242a and a side wall 2242b extending from the outer periphery of the top wall 2242a. The gas flow channel is formed in the gap between the side wall 2242b and the outer wall of the protrusion portion 2144.

A slit is formed between the bottom surface of the insulating cover 224 and the top surface of the conductive plate 214, and the slit communicates with the gas flow channel. In this solution, considering that liquid surface has tension, and liquid has poorer fluidity than gas, the provision of the slit allows smooth expelling of the gas and can prevent infiltration of liquid such as water or electrolyte.

During the gas expelling process, the gas expelled from the gas hole 214a firstly enters the covering portion 2242. In order to prevent the gas from staying in the covering portion 2242, a flow area of the gas flow channel may be set to be larger than a flow area of the slit. Herein, the larger the flow area is, the larger the gas flow volume is. In this way, sensitivity of the deformable plate 212 would not be decreased due to obstruction of the gas expelling during the deforming process.

As shown in FIG. 8, the inner wall of the covering portion 2242 is formed as an umbrella-like arc-shaped inner wall, which is a smooth curved surface. After getting into the covering portion 2242, the gas can smoothly get into the gas flow channel along the smooth curved surface until it gets outside of the battery, thereby preventing the vaporized water or electrolyte from adhering to the inner wall of the covering portion 2242 to form water droplets or electrolyte droplets. This can further prevent the water or electrolyte from entering the gas hole 214a and dropping onto the deformable plate 212.

The insulating cover 224 includes a body 2244 and an obstructing portion 2246 extending from an edge of the outer contour of the body 2244 toward the conductive plate 214. When the insulating cover 224 is assembled, the obstructing portion 2246 can be attached to the body portion 2142 so as to prevent ambient impurities from entering the gas hole 214a via the gap formed between the obstructing portion 2246 and the body portion 2142.

In an embodiment as shown in FIG. 7, the covering portion 2242 is a hollow column-shaped structure extending from the body 2244 toward the conductive plate 214 and has an umbrella-like arc-shaped inner wall.

The obstructing portion 2246 may extend along the outer edge of the body portion 2142 to form a closed structure, or it may be formed as a non-closed structure, i.e., the obstructing portion 2246 has a mouth 2246a, and the mouth 2246a allows the gas in the gas hole 214a to be expelled outward. Of course, it may also be configured that the body 2244 is provided with a vent hole(s) 2244a so as to expel the gas in the gas hole 214a. It should be noted that, the number of the vent hole(s) 2244a is not limited.

The insulating cover 224 further includes a plurality of protrusions 2248, which protrudes from the body 2244 toward the conductive plate 214. On the one hand, the protrusions 2248 may serve as a reinforcing structure for increasing strength of the body 2244.

On the other hand, the protrusions 2248 may include a surrounding portion 2248a surrounding the periphery of the covering portion 2242, and a gap is formed between the surrounding portion 2248a and the covering portion 2242.

In terms of avoiding entrance of impurities, the surrounding portion 2248a can also be used as another barrier that obstructs entrance of impurities into the gas hole 214a.

Further, it may be configured that a surface of the surrounding portion 2248a close to the conductive plate 214 and a surface of the covering portion 2242 close to the conductive plate 214 are located in a same plane. That is, the two surfaces are located at a same level. In this way, a small gap is respectively formed between the surrounding portion 2248a and the conductive plate 214 and between the covering portion 2242 and the conductive plate 214, and on the basis of satisfying the gas-expelling requirement, the difficulty for the impurities to enter the gas hole 214a can be further increased.

In addition, a part of the protrusions 2248 can be set into a convoluted portion 2248b extending along a direction of a curve. According to an exemplary embodiment, the convoluted portion 2248b may be disposed outside the region surrounded by the surrounding portion 2248a. It is particularly important to provide the convoluted portion 2248b at the mouth 2246a since it is easier for impurities to get in via this mouth 2246a.

The convoluted portion 2248b is arranged at the mouth 2246a in a bent configuration. Even if ambient impurities tends to get in along the convoluted portion 2248b, it takes a very long path to reach the gas hole 214a, thereby increasing the difficulty for impurities to get in. In addition, the convoluted portion 2248b divides space opened outwardly at the mouth 2246a into a plurality of irregular subspaces, and the impurities getting into the mouth 2246a can be separated into a respective one of the plurality of subspaces.

In addition to the surrounding portion 2248a and the convoluted portion 2248b, a part of the protrusions 2248 can serve separating portions 2248c. Each separating portion 2248c may be respectively connected to the surrounding portion 2248a and the obstructing portion 2246. The separating portions 2248c may divide space between the surrounding portion 2248a and the obstructing portion 2246 into a plurality of subspaces, and each subspace can be used to isolate impurities such as water and electrolytes, thereby further obstructing impurities to get in.

According to an exemplary embodiment, the vent hole 2244a can be provided in the protrusion 2248. For example, the vent hole 2244a is provided in the convoluted portion 2248b, and the vent hole 2244a penetrates the convoluted portion 2248b and the body 2244 so as to expel the gas in the gas hole 214a. With this configuration, in this long path for impurities getting into the gas hole 214a via the convoluted portion 2248b, since the vent hole 2244a communicates with the ambiance, water or electrolyte attached to the convoluted portion 2248b or isolated in the subspace can be evaporated before reaching the gas hole 214a.

It should be noted that the vent hole 2244a can be provided in the separating portion 2248c or the surrounding portion 2248a, which will not be limited herein in the present disclosure.

In an embodiment, the surface of the obstructing portion 2246 close to the conductive plate 214 can be set to be higher than the surface of the convoluted portion 2248b close to the conductive plate 214, and the surface of the convoluted portion 2248b close to the conductive plate 214 is higher than the surface of the surrounding portion 2248a close to the conductive plate 214. With this arrangement, the sizes of the gaps formed between the obstructing portion 2246 and the conductive plate 214, between the convoluted portion 2248b and the conductive plate 214, and between the surrounding portion 2248a and the conductive plate 214 sequentially decrease, and the difficulty for the impurities to enter the gas hole 214a gradually increases as the sizes of the gaps decreases.

The insulating cover 224 is fixed in a snap-fit manner. The insulating cover 224 further includes a mounting protrusion 2250 provided on the obstructing portion 2246. The mounting protrusion 2250 is used to mate with an insulating member (an upper insulating piece 218) wrapping the conductive plate 214.

The mounting protrusion 2250 is a wedge-shaped protrusion. In the assembling process, a small end of the wedge-shaped protrusion first contacts with the upper insulating piece 218, and an installation depth is gradually increased under the mounting force, and finally, a large end of the wedge-shaped protrusion and the upper insulating piece 218 squeeze each other to keep the two relatively fixed.

During the installation process of the insulating cover 224, the wedge-shaped protrusion can play a role of flow guiding. As the installation depth increases, the interference amount between the mounting protrusion 2250 and the upper insulating piece 218 increases, and the fixing effect gradually increases.

With further reference to FIG. 3, the top cover assembly 200 further includes a vent 226, an insulating piece 228, and the like. The vent 226 seals an explosion-proof opening 202b of the top cover plate 202. The vent 226 is arranged to open when the internal pressure of the secondary battery 1000 reaches a predetermined pressure, which can be higher than a threshold pressure for deforming the deformable plate 212.

The insulating piece 228 includes a base portion 228a and a column-like protrusion portion 228b. The base portion 228a is disposed between the flange portion 2042 of the first electrode terminal 204 and the top cover plate 202, and the column-like protrusion portion 228 sleeves the column portion 2044 of the first electrode terminal 204 so as to achieve sealing of the column portion 2044 and top cover plate 202 at the side of the first electrode terminal 204.

The present disclosure also provides a vehicle that includes the secondary battery in any of the above embodiments.

The above-described embodiments are merely preferred embodiments of the present disclosure and are not intended to limit the present disclosure. To those skilled in the art, various modifications and changes may be made. However, any modifications, equivalent substitutions and improvements made within the principle of the present disclosure shall fall into the protection scope of the present disclosure.

What is claimed is:

1. A secondary battery top cover assembly, comprising:
a top cover plate;
an electrode terminal;
an insulating cover; and
a short-circuit component comprising a deformable plate and a conductive plate disposed above the deformable plate, wherein the deformable plate is connected to the top cover plate, and the conductive plate is connected to the electrode terminal;
wherein the conductive plate comprises a body portion and a protrusion portion protruding upwardly from the body portion, the conductive plate is provided with a gas hole, the gas hole cuts through the protrusion portion and the body portion, and an inner wall of the gas hole comprises an arc-shaped smooth transition portion;
wherein the insulating cover comprises a covering portion disposed above the conductive plate and covering the protruding portion and the gas hole, a body and an obstructing portion protruding from an edge of an outer contour of the body toward the conductive plate;
wherein the covering portion is provided on the body, and the obstructing portion surrounds the covering portion; and
wherein the insulating cover further comprises a protrusion extending from the body toward the conductive plate, the protrusion comprises a surrounding portion which surrounds the covering portion, and space is formed between the surrounding portion and the covering portion.

2. The secondary battery top cover assembly according to claim 1, wherein the arc-shaped smooth transition portion has an aperture size decreasing upwards.

3. The secondary battery top cover assembly according to claim 1, wherein the inner wall of the gas hole comprises a first guide portion connected to the arc-shaped smooth transition portion, and wherein the first guide portion extends from the arc-shaped smooth transition portion toward the body portion and is connected to the body portion, and the first guide portion has an aperture size increasing downwards.

4. The secondary battery top cover assembly according to claim 1, wherein the inner wall of the gas hole further comprises a second guide portion connected to the arc-shaped smooth transition portion, and the second guide portion extends upwardly from the arc-shaped smooth transition portion.

5. The secondary battery top cover assembly according to claim 1, wherein the gas hole is aligned with a center of the deformable plate,
wherein the conductive plate further incudes an annular contact portion protruding downwardly, and the annular contact portion contacts with the deformable plate when the deformable plate is deformed upwardly, and
wherein a thickness of a region of the conductive plate located inside the annual contact portion is smaller than a thickness of a region of the conductive plate located outside the annual contact portion.

6. The secondary battery top cover assembly according to claim 1, wherein the top cover plate is provided with a through hole, the deformable plate seals the through hole, the secondary battery top cover assembly further comprises an annular sealing piece, and
wherein the annular sealing piece is disposed between the conductive plate and the top cover plate and seals the through hole and the gas hole.

7. A secondary battery, comprising:
an electrode assembly;
a case for accommodating the electrode assembly; and
the secondary battery top cover assembly according to claim 1,
wherein the secondary battery top cover assembly seals an opening of the case, and the electrode terminal is connected to the electrode assembly.

8. A vehicle, comprising the secondary battery according to claim 7.

9. The secondary battery top cover assembly according to claim 1, wherein a surface of the surrounding portion close to the conductive plate is located on a same plane as a surface of the covering portion close to the conductive plate.

* * * * *